(12) United States Patent
Karlsen et al.

(10) Patent No.: US 7,407,345 B2
(45) Date of Patent: Aug. 5, 2008

(54) METHOD AND A SYSTEM OF DISTRIBUTION OF FLUIDIZABLE MATERIALS

(75) Inventors: Morten Karlsen, Øvre Årdal (NO); Bernt Nagell, Haugesund (NO); Kjell Magne Dalen, Haugesund (NO)

(73) Assignee: NorskHydro ASA, Oslo (NO)

( * ) Notice: Subject to any disclaimer, the term of this patent is extended or adjusted under 35 U.S.C. 154(b) by 0 days.

(21) Appl. No.: 11/652,560

(22) Filed: Jan. 12, 2007

(65) Prior Publication Data

US 2007/0110525 A1 May 17, 2007

Related U.S. Application Data

(62) Division of application No. 10/472,584, filed as application No. PCT/NO02/00116 on Mar. 20, 2002.

(30) Foreign Application Priority Data

Mar. 21, 2001 (NO) .................................. 20011446

(51) Int. Cl.
*B65G 53/20* (2006.01)
(52) U.S. Cl. .......................... 406/156; 406/89; 406/155
(58) Field of Classification Search .................. 406/89, 406/156, 155; 700/230
See application file for complete search history.

(56) References Cited

U.S. PATENT DOCUMENTS

| | | | | |
|---|---|---|---|---|
| 2,882,097 A | 4/1959 | Hamren | | |
| 3,077,365 A * | 2/1963 | Fisher | .......................... | 406/23 |
| 3,115,369 A * | 12/1963 | Bozich | .......................... | 406/14 |
| 3,185,434 A * | 5/1965 | Bozich | .......................... | 406/28 |
| 3,224,812 A * | 12/1965 | Bozich | .......................... | 406/1 |
| 3,603,646 A * | 9/1971 | Leoff | .......................... | 406/89 |
| 3,671,078 A | 6/1972 | Wise | | |
| 3,753,867 A * | 8/1973 | Weimer | ..................... | 202/262 |
| 3,901,555 A * | 8/1975 | Wise | .......................... | 406/3 |
| 3,945,683 A | 3/1976 | Wise | | |
| 4,016,053 A | 4/1977 | Stankovich et al. | | |
| 4,299,683 A | 11/1981 | Adorno et al. | | |
| 4,599,017 A | 7/1986 | Russemeyer et al. | | |
| 4,659,263 A | 4/1987 | Hanrot et al. | | |
| 4,747,732 A | 5/1988 | Harnot et al. | | |
| 5,360,297 A * | 11/1994 | Enstad et al. | .................. | 406/89 |
| 5,474,401 A * | 12/1995 | Paulsen et al. | ................. | 406/85 |
| 5,622,457 A | 4/1997 | Thiele | | |
| 5,884,126 A * | 3/1999 | Schoch et al. | ................ | 399/258 |
| 6,000,884 A * | 12/1999 | Ingraham | ..................... | 406/19 |

(Continued)

FOREIGN PATENT DOCUMENTS

EP 0615786 9/1994

(Continued)

*Primary Examiner*—Douglas A Hess
(74) *Attorney, Agent, or Firm*—Wenderoth, Lind & Ponack, L.L.P.

(57) ABSTRACT

A method and a system distribute fluidizable materials from a reservoir of materials to one or more material receiving units. The distribution system has at least two hydraulic levels between the reservoir and the material receiving units. The system further includes a fluidizing element with good dynamic response properties. The system can be used for distribution of alumina and/or fluoride to feeding equipment in electrolysis cells with a reduced consumption of fluidizing gas.

10 Claims, 4 Drawing Sheets

U.S. PATENT DOCUMENTS

| | | | |
|---|---|---|---|
| 6,309,144 B1 * | 10/2001 | Ingraham | 406/19 |
| 6,382,881 B1 | 5/2002 | Gasquet et al. | |
| 6,402,437 B1 | 6/2002 | Gasquet et al. | |
| 6,749,373 B2 | 6/2004 | Von Geldern et al. | |
| 6,764,253 B1 * | 7/2004 | Pfeiffer | 406/11 |
| 7,048,475 B2 | 5/2006 | Cloue et al. | |
| 7,144,204 B2 * | 12/2006 | Hilgraf | 406/95 |

FOREIGN PATENT DOCUMENTS

NO            175876         9/1994

* cited by examiner ously be a separator for separating unwanted objects out
METHOD AND A SYSTEM OF DISTRIBUTION OF FLUIDIZABLE MATERIALS This application is a divisional application of Ser. No. 10/472,584, filed May 6, 2004, which is a National Stage Application of International Application Serial No. PCT/NO02/00116, filed Mar. 20, 2002.

BACKGROUND OF THE INVENTION

1. Field of the Invention

The present invention relates to a method and a system for distribution of fluidizable materials. In particular the invention relates to distribution of fluidizable materials such as fluoride and/or aluminium oxide (alumina) within an electrolysis facility for the production of aluminium.

2. Description of Related Art

NO patent 175876 describes an apparatus for transport of powder materials by fluidizing the materials. The apparatus comprises an enclosed first fluidized channel for distribution of materials from a reservoir to a plurality of outlets. At each outlet there are arranged feeding devices for individual feeding of materials, such as alumina, to separate feeding holes in the crust of an electrolysis cell. The channel for distribution of materials comprises two horizontally divided sections where the sections are divided by means of a porous wall. The upper section is completely filled with fluidized materials, while the lower section act as a distribution chamber for fluidizing gas. The lower section is provided with fluidizing gas by means of a fan. The mentioned feeding devices comprise at least one second fluidized channel having plural outlets shaped as downwardly directed tubes. The outlets are surrounded by a casing having feeding holes in its bottom. The downwardly directed tubes end above the bottom part of the casing, and material leaving the outlets will be blocked as the level of material in the casing reaches a certain level. As materials are consumed, the level in the casing will drop and the outlets will be free of materials. Followingly, materials will start to flow into the casing from the reservoir through the first fluidizing channel and into the feeding device via the second fluidizing channel. To obtain this self-controlled feeding, the channels have to be fluidized continuously by the fan. Further, in the system the materials will be transported in accordance with one hydraulic step, and as a consequence of this, the vertical level between the uppermost material storage and the lowermost material outlet becomes high. In an electrolysis facility, such fluidized channels may have an extension of several hundred meters while the angular decline of the channel may be some degrees. Under certain unwanted circumstances such high static pressure differences in the transport system may lead to an uncontrolled transportation of materials such as rapid drainage of materials from the storage with a resulting undesired over-feeding of materials to the electrolysis cell as a consequence. Further, the energy consumed in the described system will be relatively high because the system is likely to be driven in a continuously fluidizing modus to operate in a satisfying manner.

SUMMARY OF THE INVENTION

With the present invention the above mentioned disadvantages can be avoided. In accordance with the present invention, the transport system has two or more hydraulic levels that are serially connected with each other by means of inlet locks. The system works with rapid material speeds while the fluidizing channels will not be topped up by fluidized material. The fluidizing gas supplied at each individual fluidizing element will be discharged in a non-continuous (i.e., continuous in transport modus only), controlled manner, thus keeping the energy consumed at a minimum level. For this purpose, there has been developed a fluidizing element specially adapted to fit within the system. Further the non-continuous way of discharging fluidizing gas will initiate a flushing of the system at each start-up, thus draining the system of unwanted objects, large particles, etc.

BRIEF DESCRIPTION OF THE DRAWINGS

The invention shall further be described in the following by examples and figures where.

DETAILED DESCRIPTION OF THE INVENTION

Figure 1:
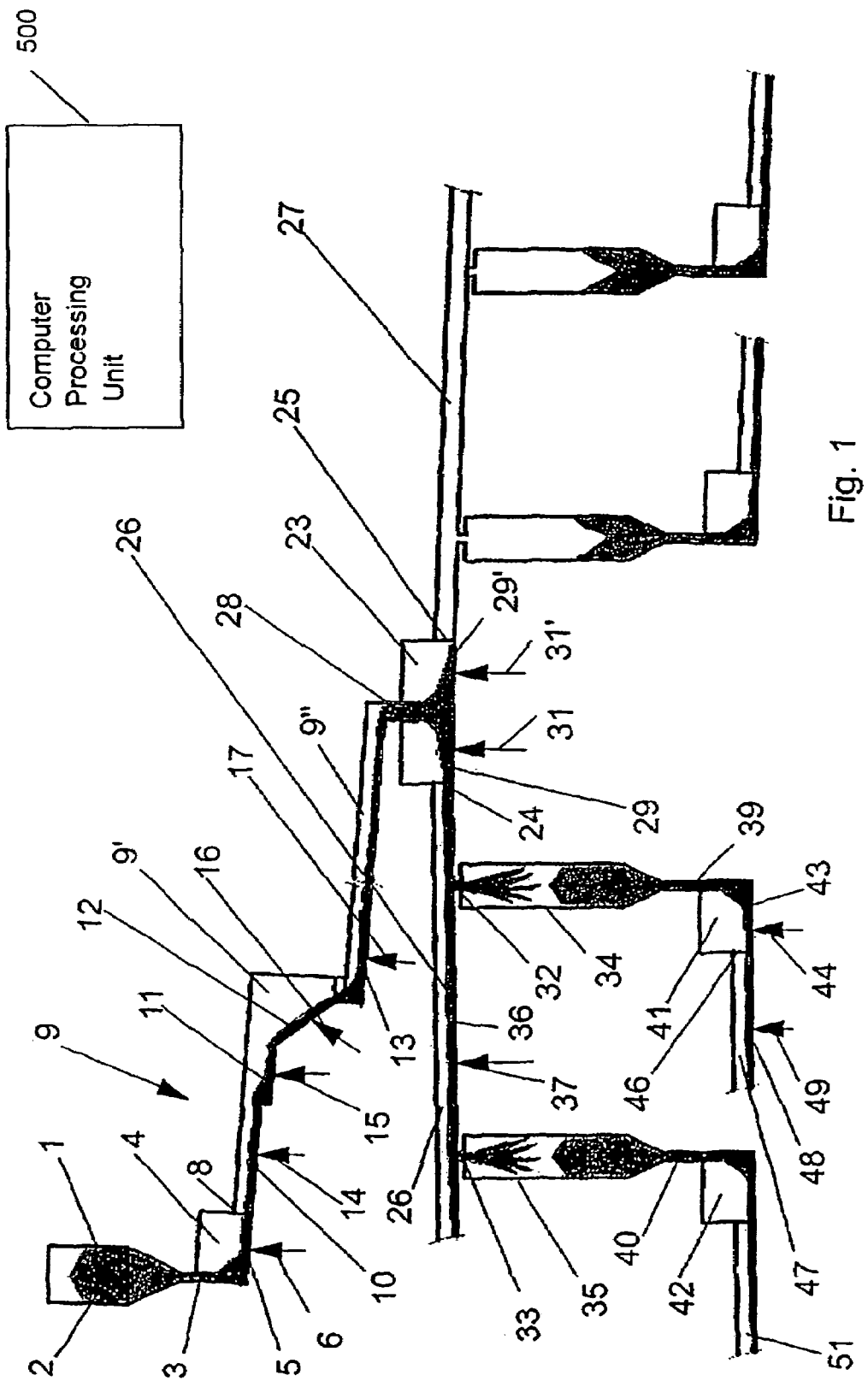
FIG. 1 shows the principles of transporting materials in accordance with the invention from a reservoir to a plurality of material receiving units.

In FIG. 1 there is shown a reservoir I containing fluidizable powder materials 2. The reservoir is provided with a tubular outlet 3 at its bottom that protrudes into an inlet box 4. The feeding from the reservoir to the inlet box may be performed in accordance with the gravity feeding principle. The inlet box 4 is formed as a rectangular box and is provided with at least one fluidizing element 5 at its bottom. In the figure, the fluidizing element is not shown in detail, but such elements are commonly placed along the bottom part of means containing materials to be fluidized. Preferably the element covers only a part of the bottom, and not the projected area with respect to the outlet 3. The fluidizing element receives pressurized gas through an inlet pipe 6 that may have a controllable valve (not shown) for controlling the supply of pressurized gas to the element. Alternatively the fluidizing elements of the system can be provided with inlet nozzles communicating with the inlet pipes where the nozzles are provided with an orifice size that gives a desired fluidizing velocity through the fluidizing elements. The inlet box 4 has further an outlet 8 that communicates with a pneumatic conveyer 9. The declination of this part of the conveyer is preferably about 3°. It should be understood that the term pneumatic conveyer in an embodiment may be similar to an air slide conveyer. The function of the inlet box is as follows. Powder material will be fed from the reservoir towards the bottom of the inlet box 4. The geometrical design of the inlet box, the tubular outlet from the reservoir, together with the static or dynamic angle of slide of the material itself will cause an inclined build-up of material towards the outlet 3 of the reservoir 1 (also indicated in FIG. 1). In periods of no transport of materials out of the inlet box, the transport of materials from the reservoir to the inlet box will stop completely. Preferably the length of the tubular outlet 3 is five times its inner diameter or more.

The pneumatic conveyer has preferably a plurality of fluidizing elements 10, 11, 12, 13 arranged at its bottom part similar to that of element 5. Further, similar to that mentioned under element 5, these elements can receive pressurized gas through respective inlet pipes 14, 15, 16, 17 having controllable valves (not shown). In the conveyer, a part 9' may advantageously be a separator for separating unwanted objects out of the conveyer. The separator is not shown in detail here, but can preferably be of a fluidizable type.

The sections of the conveyer such as section 9" may have a declination of 1° with respect to the horizontal level. This small declination can be realized with the use of a novel fluidizing element which will be further explained under FIG. 3. At its outlet end, the section 9" is connected with a distributor box 23 for the distribution of materials in at least two directions. An outlet 28 of the section comprises a downward directed tube or pipe that ends above the bottom part of the distribution box. Preferably, the length of the pipe is five times its inner diameter or more.

At its bottom part, the distributor box 23 in this embodiment is provided with two fluidizing elements 29, 29' that partly cover its bottom. Inlet pipes 31, 31' are respectively connected with the fluidizing element 29, 29' via a controllable valve (not shown). Similar to that of the inlet box 4, the geometrical design of the distribution box, the arrangement of the tubular outlet from the reservoir, together with the static or dynamic angle of slide of the material itself will cause an inclining build-up of material towards the outlet 28 of the section 9" (also indicated in FIG. 1). The distributor box can in principle be provided with one or more fluidizing elements, but in the present embodiment having two elements, these are preferably symmetrically arranged with respect to the outlet 28. The elements may be arranged with a space between them, thus not covering the projected area beneath the outlet 28.

The function of the distribution box is as follows. Powder material will be fed from the outlet 28 of the conveyer section 9" towards the bottom of the distributor box 23. In periods of no transport of materials out of the distributor box, the transport of materials from the conveyer section 9" to the distributor box will stop completely.

In this example, there is shown a distributor box with two outlets 24, 25 connected with pneumatic conveyer sections 26, 27, respectively. However, it should be understood that the present principle of transporting fluidizable materials does not limit the distribution box to include only two outlets. The distributor box may for instance be circular as seen from above and have the number of outlets required to suit in each individual application.

In the figure, the conveyer sections 26 and 27 are identical, and therefore only the first mentioned section will be described in detail in the following. The declination of these conveyers is preferably about 1°. As in the previously described conveyer sections, section 26 comprises one or more fluidizing elements 36 arranged in its bottom and further connected with an inlet pipe 37 for pressurized gas that can be controlled by valve (not shown). It should be understood that in periods when at least one of these elements is activated, the fluidizing element 29 is normally activated as well. As will be seen in the figure, there is arranged two outlets 32, 33 in the partly shown conveyer section 26. These outlets communicate with intermediate storage tanks 34, 35 respectively, where material can be delivered for instance to individual electrolysis cells from each tank. Preferably, the outlets 32, 33 are arranged as openings in one side wall of the conveyer that further are provided with downward directed tubes. Sideways openings are preferred because if one tank 34 has been filled up and as a consequence the outlet 32 will be blocked by materials, the flow of materials through the section 26 will still be able to pass by the outlet without hindrance of materials that builds up in the outlet region.

In the bottom part of the tanks 34, 35 there are arranged tubular downward directed outlets 39, 40 that feed materials to inlet boxes 41, 42 and conveyor sections 47, 51, respectively. Preferably, the length of the outlet tubes are five times their inner diameter or more. The boxes are identical and therefore only box 41 will be described here. Similar to the function of the inlet box 4, the inlet box 41 comprises at least one fluidizable element 43 provided with pressurized gas through pipe 44 controlled by a valve (not shown). Preferably, the element covers only a part of the bottom, and not the projected area with respect to the outlet 39.

Powder material will be fed from the outlet 39 towards the bottom of the inlet box 41. The geometrical design of the inlet box, the tubular outlet from the tank 34, together with the static or dynamic angle of slide of the material itself will cause an inclining build-up of material towards the outlet 39 of the tank 34 (also indicated in FIG. 1). In periods of no transport of materials out of the inlet box, the transport of materials from the tank to the inlet box will stop completely.

The inlet box 41 has an outlet 46 that communicates with a pneumatic conveyer section 47 having one or more fluidizing elements 48 connected with an inlet pipe 49 for pressurized gas that can be controlled by a valve (not shown). The declination of this conveyer is preferably about 1.5°. The conveyer section 47 may convey materials such as aluminium oxide and/or fluoride to the superstructure of an electrolysis cell (not shown) to appropriate feeding devices arranged therein (not shown). The declination of this part of the conveyer is preferably about 0.5°.

Figure 2:
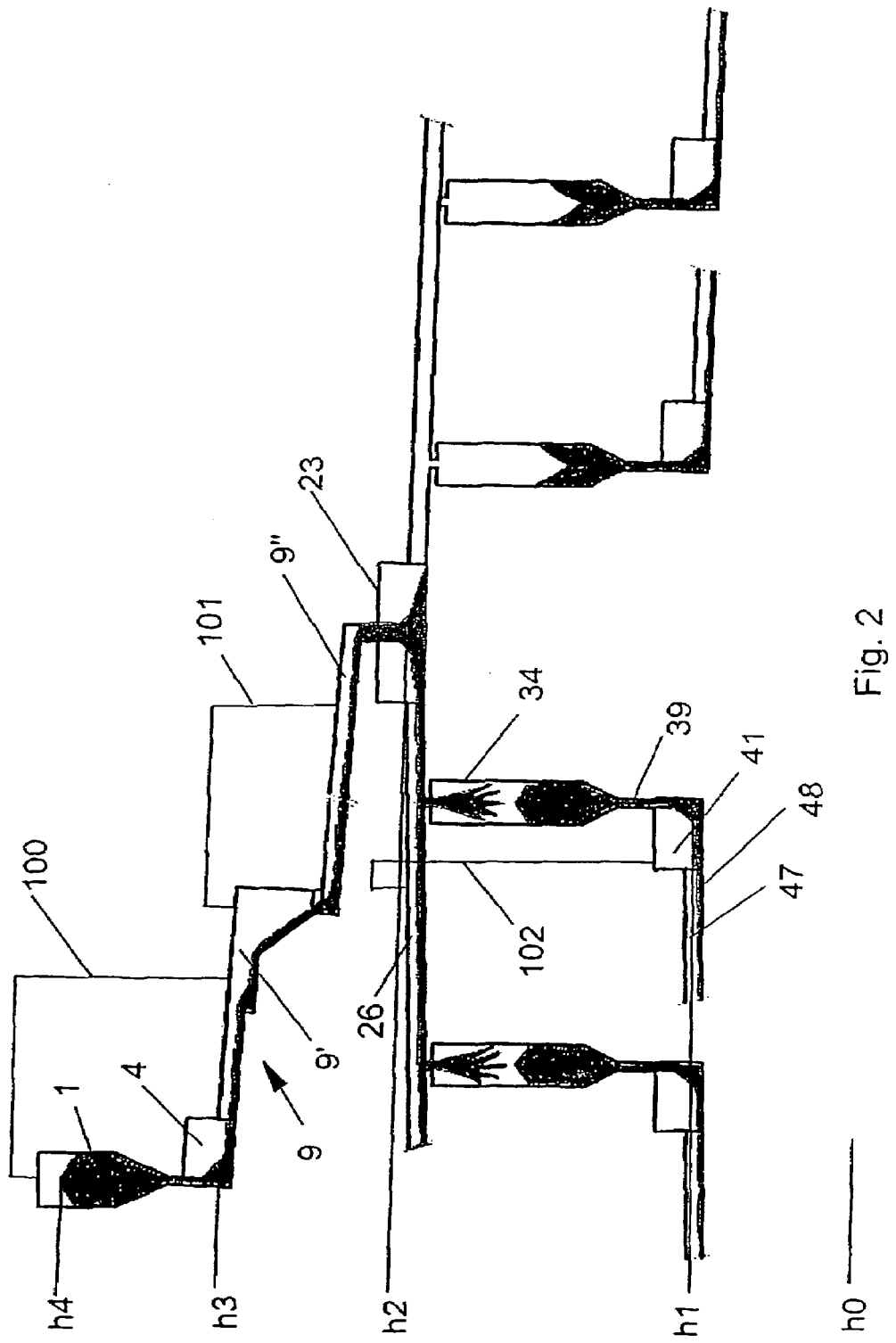
FIG. 2 shows more details of the principles as defined in FIG. 1, FIG. 3 discloses in part a cross-section view of a novel fluidizing element for use in accordance with the invention, and FIG. 4 discloses an operating scheme for performing transport of fluidizable materials in accordance with the system.

FIG. 2 discloses more details of the principles as described in FIG. 1. In FIG. 2, the same system as described in FIG. 1 is disclosed, but additional equipment such as de-aeration devices and different hydraulic levels are disclosed in this figure. Advantageously, there are arranged de-aeration pipes 100, 101, 102 between section 9 (see FIG. 1) and the reservoir 1, between section 9" and section 9 or separator 9', and finally between inlet box 41 and section 26, respectively. Preferably, the elevation of the bends in this pipe is 250 millimeters or more above its upper connection point to avoid transport of materials through the de-aeration pipes.

In the figure, there is further marked different levels h0, h1, h2, h3 and h4. In a fluidized state, the powder material will not act as particulate matter, but will rather behave more like a fluid (liquid). In operation, the various fluidizing elements will normally not be activated at the same time. These elements will rather be operated either periodically or by demand in accordance with various transport patterns to ensure that materials are transported to all material receiving units in the system and that it delivers sufficient amounts of materials within a predefined period of time. For instance, there can be connected one or more feeding silos (arranged in the superstructure of each electrolysis cell) at the end of all conveyer sections similar to and including section 47 having a total capacity for some hours of operation. To deliver enough materials to fill these silos up, the branch of the conveying system comprising each section 47 just has to run part-time depending on powder velocity, storage capacity of feeding silos and cross section flow rate versus the actual amount consumed. In periods where this branch is inactive, similar operations can be performed elsewhere in the system, thus saving momentary capacity of pressurized gas and energy.

In the figure, level h1 at inlet box 41 indicates a liquid stop that will restrict fluidized materials above this level to pass through the level in a situation where materials have built up in the inlet box 41 and followingly blocked the outlet 39 of the tank 34. Similar situations will be representative for levels h2 and h3. At level h2, the distributor box 23 will act as a liquid stop, and followingly materials will be restricted from passing through this level as a result of material build-up in this box. Accordingly, at level h3, the inlet box 4 will act as a liquid stop, restricting materials from leaving the reservoir 1. In the Figure, h1 indicates atmospheric pressure, while h0 indicates the feeding valve of the end user.

In operation, the system will fluidize in branches. For instance, in one period one branch including inlet box 4, conveyer 9 and 9", distributor box 23, and at least a part of conveyer section 26 will be activated by fluidizing gas and materials will flow from the reservoir 1 to the tank 34. As tank 34 fills up, the part of the conveyer 26 between tank 34 and tank 35 can be fluidized to cause transport of materials to tank 35. If materials still are required downstream of the conveyer section 26, materials will continue to flow and pass by the inlet 32 of the tank 34, and the inlet 33 of the tank 35. At the end when all receivers downstream conveyer section 26 have become filled up, the flow of materials in section 26 will be brought to rest. Assuming that there is no flow of materials in conveyer section 27, then there will be a material build-up in the distributor box 23 and followingly the material flow through conveyer sections 9" and 9 will be stopped and brought to rest. Following that, the inlet box 4 will receive a build-up of material and flow of materials from reservoir 1 to inlet box will be stopped.

If material fill-up is required downstream of tank 34, for instance, with respect to the conveyor section 47, this can be performed by activating the fluidizing elements 48 in section 47. Materials will then start to flow from the tank 34 towards the material receiving unit(s). At the end when no more materials are required downstream of the conveyer section 47, the material flow will be stopped in branch 47 and the inlet box 41 will be blocked by material build-up.

If then the similar conveyer section 27 (see also FIG. 1) is activated by running fluidizing gas through the fluidizing elements therein, materials will start to flow through section 27 into similar tanks as previously described for tanks 34 and 35, and in accordance with a similar procedure. The material build-up in the distributor box 23 will then cease to exist because materials are removed from that location downward of conveyer 27. The fluid stop is then inactive, and followingly materials will start to flow into the distributor box 23 from conveyer 9" and 9. The fluid stop at inlet box 4 will then be inactive for the same reason as mentioned under the distributor box, and followingly materials will start to flow from reservoir 1 through the inlet box 4. This flow will continue as long as the fluidizing elements involved are active and until the similar tanks are filled up. At the end, the flow of fluidized materials will cease and stop in accordance with the pattern as described under the first mentioned branch including conveyer section 26.

It should be understood that the material transport performed by the distribution system may be controlled by a computer processing unit 500. Accordingly, there may be indicating means such as material level sensing means (not shown) in various elements of the distribution system. These sensing means may be connected with the processing unit which further may activate/deactivate the various fluidizing elements throughout the system in accordance with a defined program.

Figure 3:
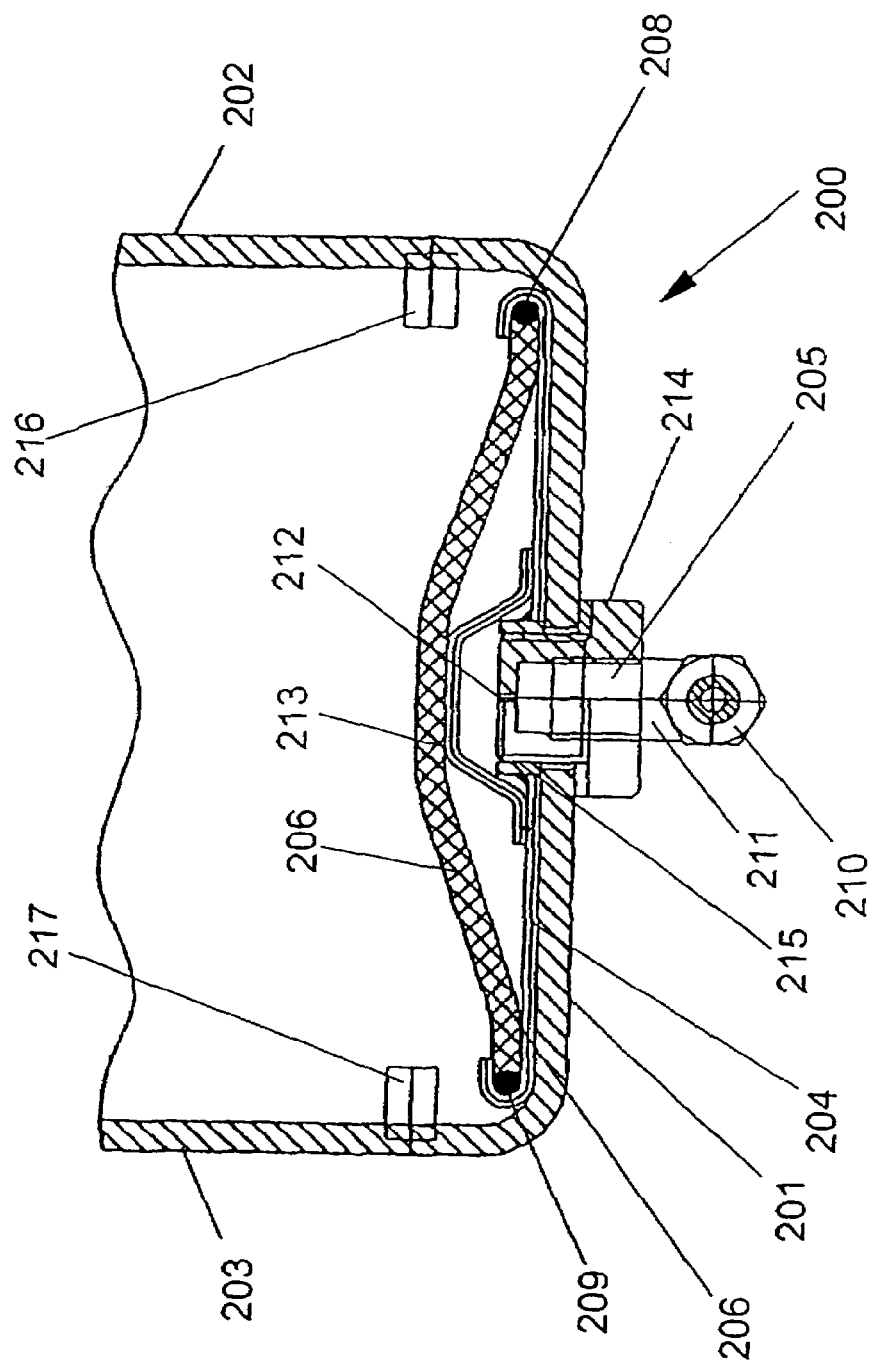

In FIG. 3 there is shown in part a cross-section cut through a conveyer channel 200 having a bottom 201, and side parts 202, 203. In the upper part of the figure there is shown a wave-shaped line indicating that the channel continues above the level of the line. The fluidizing element comprises an inlet 205, a base plate 204 and a gas permeable element 206. The gas permeable element can be made out of a web-material and is fixed at its peripheral parts to the base plate 204. In the figure, the web material is fixed by bending the outer side parts of the base plate to clamp the peripheral side parts of the web material. The base plate can be made out of a metal material, such as a steel plate. To avoid leakage of fluidizing gas, the connection between the web material and the base plate may be provided with a gasket element 208, 209. The gasket element may be of any appropriate gasket material able to withstand the physical and chemical environment in the conveyer. The above mentioned way of fixing the parts together similarly applied to the end sides of both the base plate and the web material.

The inlet 205 is constituted by a pipeline fitting 210 comprising a vertical extending pipe 211 with an orifice 212. An protective element 213 is arranged between the gas permeable element 206 and an orifice 212 to protect the element against perforation. The element may be provided with openings in one or more of its side surfaces, or be open ended as indicated in the figure. The base plate 204 of the fluidizing element is provided with an internally threaded part 215 communicating with a hollow, sleeved nut 214 having external threads. This arrangement passes through a hole in the bottom 201 of the conveyer channel, thus serving to keep the fluidizing element fixed to the bottom of the conveyer channel. Projections 216, 217 may be arranged in the side parts 202, 203 of the channel to secure the fluidizing element and prevent unwanted displacement.

One special advantage related to the fluidizing element as described above is that the plenum-chamber has a very little volume, thus rendering a quick fluidizing response of the material when fluidizing gas is introduced into the plenum-chamber. This further implies that unwanted non-fluidizable objects in the transport system can be gradually moved out of the system by the relatively strong gas-flow pulse that occurs by the activation of the element.

Preferably, the fluidizing velocity through the permeable part of the fluidizing elements is set to 0.02 meters per second (i.e., volume of fluidizing gas per second versus the area of the permeable part of the fluidizing element).

Figure 4:
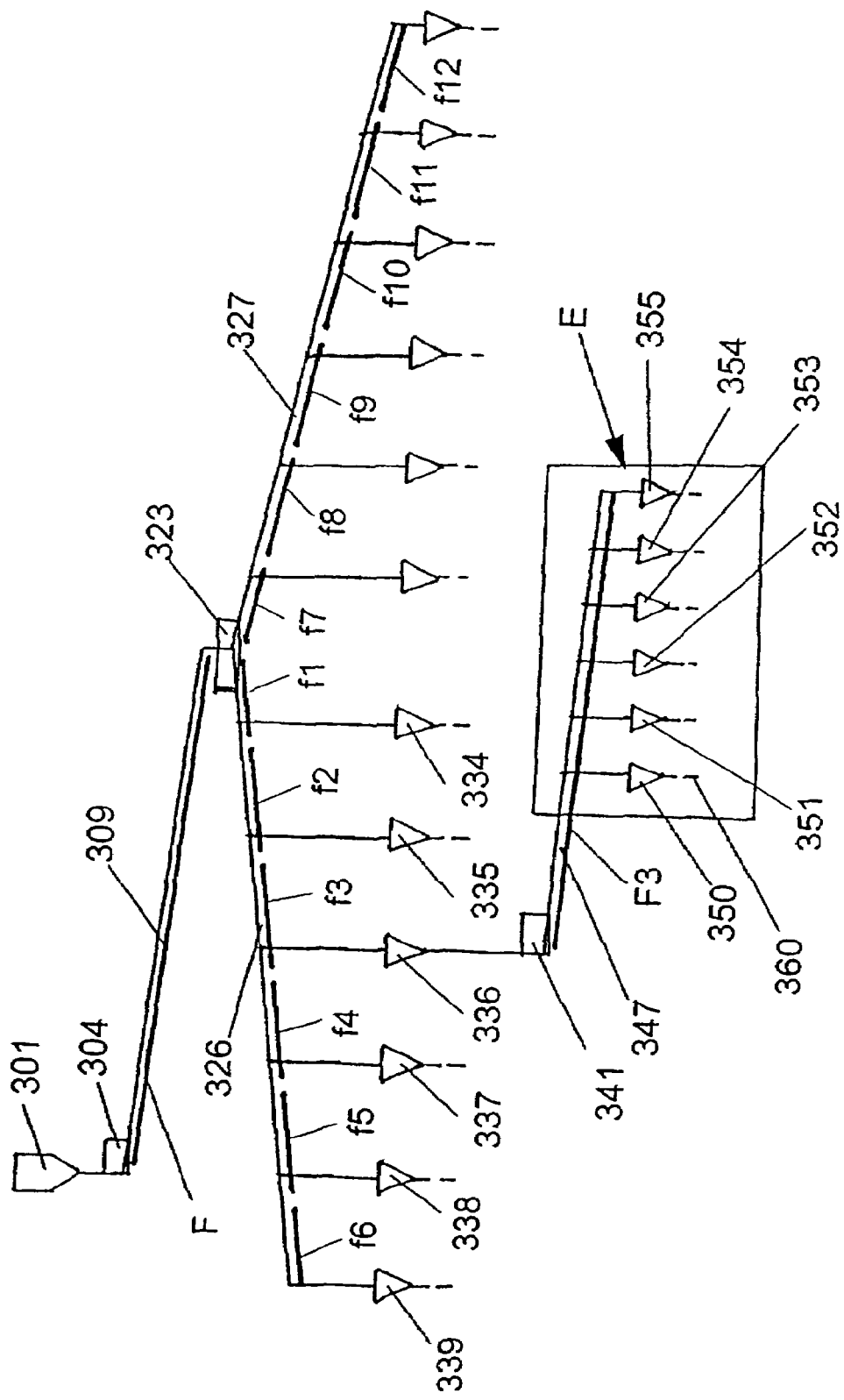

FIG. 4 discloses an operating scheme for performing transport of fluidizable materials in accordance with the system. In the scheme there are similar components as those described in FIG. 1, where a reservoir 301 communicates with an inlet box 304. The inlet box communicates with a conveyer 309 having at least one fluidizing element F. The conveyer is connected with a distribution box 323 that can distribute material in conveyer 326 and/or conveyer 327. Conveyer 326 transports materials to six tanks 334-339, while conveyer 327 transports materials to a similar number of tanks. The systems concerned with conveyer 326 and the conveyer 327 are in this embodiment identical (not all parts shown) and thus only one conveyer will be described here. Downstream of the distributor 323 there is arranged one fluidizing element f1. When activating element F in conveyer 309 and the element, materials will be transported from reservoir 301 to tank 334 with little consumption of pressurized gas. Controlled by time and possibly by full-tank indication, the fluidizing element f2 will be activated while F and f1 still are active. Then, tank 335 may be filled up by the material transport. Controlled in the same manner as that for the previous tank, fluidizing element f will be activated, thus initiating filling of tank 336. Similar procedures can be carried out for tanks 337, 338, and 339. Then, a similar procedure can be carried out to fill similar tanks connected with conveyer 327, where the fluidizing elements f7-f2 can be activated successively. The average consume of pressurized gas can be calculated on the basis of the following relation based upon the average activation time of the fluidizing elements: $F+(f1 \ldots fn) \times \frac{1}{2}$ the suffix "n" indicates the total number of fluidizing elements and correspondingly the number of tanks in one conveyer similar to the conveyer 326.

In the above mentioned embodiment, the fluidizing elements are fluidized progressively one by one to fill the tanks one by one. Alternatively, groups of tanks can be filled in one sequence. For instance, the fluidizing elements f1 and f2 can be activated simultaneously, to fill tanks 334 and 335 in one sequence. As tank 335 has been filled up, for instance sensed by a level indicator (not shown), the elements f3 and f4 can be activated to carry out a similar filling procedure.

In the figure there is schematically shown an electrolysis cell E fed by materials from feeding units 350-355. Such feeders may commonly be constituted by a small reservoir and a metering device for feeding materials into the cell through a pipe 360 or the like. The feeders receive materials from a conveyer 347 and are fluidized by one or more fluidizing elements F3. As the element F3 is activated, materials will start to flow from tank 336 through inlet box 341 and into the conveyer 347. The feeding units 350-355 will then receive material and fill up. Preferably, this latter branch is not activated when filling of tank 336 is carried out, to avoid possible direct flow of materials from reservoir 301 and to the feeding units 350-355. However, there will be defined hydraulic levels with restrictions/blocks between them even though the system is fluidized in conveyers from start to end that will make such direct flow possible. This is because the projected area of the downward directed inlets in the inlet boxes, together with the length versus diameter relation of the inlet, will initiate non-fluidized flow restrictions in the system.

Preferably, the transport of materials in the system is carried out in the most economical manner with respect to instant pressurized gas capacity, and to satisfy the requirements with regard to all-over minimum filling levels.

It should be understood that the control of the feeding units 350-355 preferably is connected with the operation of the electrolysis cell, and the discharge out of these units can be controlled in accordance with a cell control program not further specified here.

The system as described above will sustain several advantages. One important feature is that the relatively small, batchwise transportation and distribution to a plurality of material receivers will contribute to counteract segregation and thus to homogenize the material. Thus the consequences of variations in the quality of the material to be distributed will be evened out between all material receivers in the system.

What is claimed is:

1. A method for distributing a fluidizable powder material with assistance of gravity from a reservoir to a plurality of individual material receiving units through separate outlets arranged in at least one fluidizable conveying device, a first of the plurality of material receiving units being located upstream of a second of the plurality of material receiving units, the at least one fluidizable conveying device having a decline and further including a first fluidizing element and a second fluidizing element, at least one of the first and second fluidizing elements being activatable separately from another of the first and second fluidizing elements, the method comprising:

activating only the first fluidizing element of the at least one fluidizable conveying device having the decline when transporting the fluidizable powder material with the assistance of gravity to the first material receiving unit via a first of the outlets; and activating both the first and second fluidizing elements of the at least one fluidizable conveying device having the decline when transporting the fluidizable powder material with the assistance of gravity to the second material receiving unit via a second of the outlets, wherein the transporting of the fluidizable powder material to the first material receiving unit does not transport the fluidizable powder material through the second material receiving unit and the transporting of the fluidizable powder material to the second material receiving unit does not transport the fluidizable powder material through the first material receiving unit.

2. A method according to claim 1, wherein said activating of the first fluidizing element comprises applying pressurized fluidizing gas in the first fluidizing element in a non-continuous manner according to transport demands, and said activating of both the first and second fluidizing elements comprises applying pressurized fluidizing gas in both the first fluidizing element and the second fluidizing element in a non-continuous manner according to transport demands.

3. A method according to claim 1, further comprising controlling the at least one fluidizable conveying device having the decline with a computer such that the first and second fluidizing elements are activated successively.

4. A system for distributing fluidizable powder materials with assistance of gravity, the system comprising:

a reservoir for storing a fluidizable powder material to be distributed; and at least one fluidizable conveying means for distributing the fluidizable powder material through separate outlets arranged therein to a plurality of individual material receiving units, said at least one fluidizable conveying means having a decline, and a first of the plurality of material receiving units being located upstream of a second of the plurality of material receiving units, wherein said at least one fluidizable conveying means having the decline comprises a plurality of fluidizing elements including a first fluidizing element and a second fluidizing element, at least one of said first and second fluidizing elements being activatable separately from another of said first and second fluidizing elements, said first fluidizing element being operable to transport the fluidizable powder material with the assistance of gravity to the first material receiving unit via a first of the outlets when only said first fluidizing element is activated, and said first and second fluidizing elements being operable to transport the fluidizable powder material with the assistance of gravity to the second material receiving unit via a second of the outlets when said first and second fluidizing elements are both activated, and wherein the transporting of the fluidizable powder material to the first material receiving unit does not transport the fluidizable powder material through the second material receiving unit and the transporting of the fluidizable powder material to the second material receiving unit does not transport the fluidizable powder material through the first material receiving unit.

5. A system according to claim 4, wherein said plurality of fluidizing elements are operable to be activated simultaneously to transport the fluidizable powder material to the plurality of material receiving units.

6. A system according to claim 4, wherein said plurality of fluidizing elements comprise a plurality of groups of fluidizing elements each including at least two of said fluidizing elements, said groups of fluidizing elements being operable to be activated separately to supply the fluidizable powder material to corresponding groups of the plurality of material receiving units.

7. A system according to claim 4, comprising a plurality of said fluidizable conveying means, each of said plurality of fluidizable conveying means for distributing the fluidizable powder material from said reservoir to corresponding material receiving units as a separate path for material distribution.

8. A system according to claim 7, wherein said plurality of fluidizable conveying means are operable to apply pressurized gas in a non-continuous manner to transport the fluidizable powder material.

9. A system according to claim 8, wherein said plurality of fluidizable conveying means are operable to apply the pressurized gas non-simultaneously to transport the fluidizable powder material.

10. A system according to claim 4, wherein said first and second fluidizing elements each comprise:
 a base plate;
 an inlet for supplying pressurized gas; and
 a gas permeable element attached to said base plate such that a plenum chamber is formed between said base plate and said gas permeable element.

\* \* \* \* \*